(12) United States Patent
Nakada

(10) Patent No.: US 7,019,489 B2
(45) Date of Patent: Mar. 28, 2006

(54) CAPACITY ADJUSTMENT APPARATUS FOR BATTERY PACK AND CAPACITY ADJUSTMENT METHOD FOR BATTERY PACK

(75) Inventor: Yuji Nakada, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 11/080,835

(22) Filed: Mar. 16, 2005

(65) Prior Publication Data

US 2005/0212486 A1    Sep. 29, 2005

(30) Foreign Application Priority Data

Mar. 23, 2004    (JP)    ............... 2004-084756

(51) Int. Cl.
*H02J 7/00*    (2006.01)
(52) U.S. Cl. ...................... 320/104; 320/132
(58) Field of Classification Search ................ 320/104, 320/132, 116, 118, 119
See application file for complete search history.

(56) References Cited

U.S. PATENT DOCUMENTS 5,998,969 A * 12/1999 Tsuji et al. ................. 320/132
6,163,133 A * 12/2000 Laig-Horstebrock et al. .... 320/132
6,262,561 B1 * 7/2001 Takahashi et al. .......... 320/104

FOREIGN PATENT DOCUMENTS

JP    10-322925 A    12/1998

* cited by examiner

*Primary Examiner*—Pia Tibbits
(74) *Attorney, Agent, or Firm*—Foley & Lardner LLP

(57) ABSTRACT

A battery pack capacity adjustment apparatus, which is installed in a vehicle, executes capacity adjustment for a plurality of cells constituting a battery pack by raising the target charging rate for the battery pack from a first target charging rate to a second target charging rate when a voltage variance abnormality among the plurality of cells is detected and the currently traveling vehicle is predicted to stop.

6 Claims, 6 Drawing Sheets

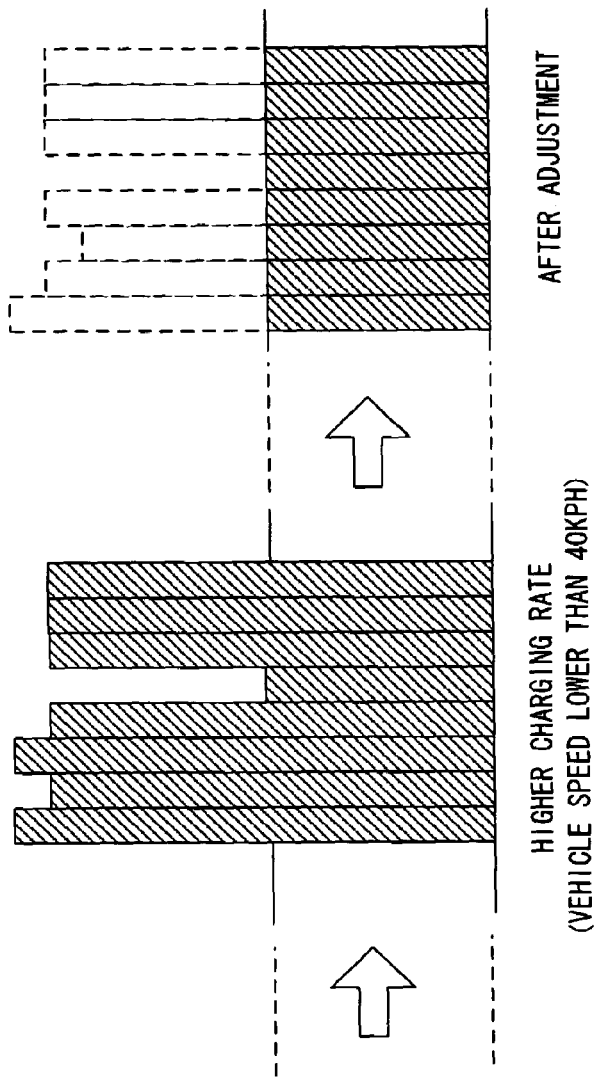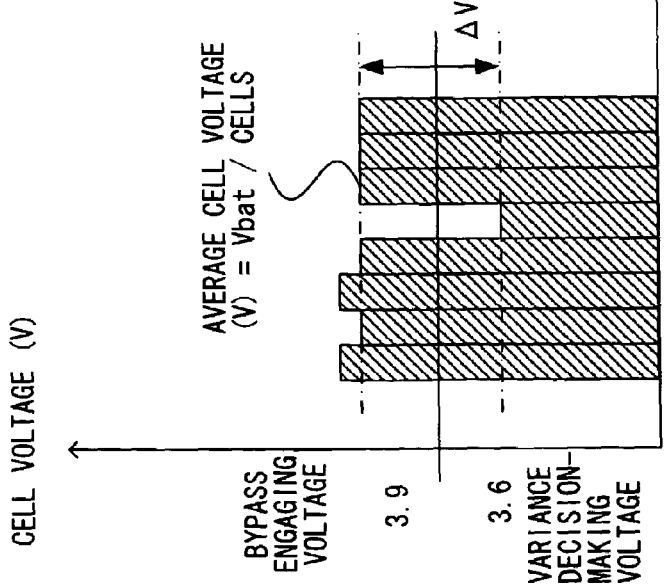

CAPACITY ADJUSTMENT APPARATUS FOR BATTERY PACK AND CAPACITY ADJUSTMENT METHOD FOR BATTERY PACK

BACKGROUND OF THE INVENTION

1. Field of the Invention

The present invention relates to a capacity adjustment apparatus and a capacity adjustment method to be adopted in conjunction with a battery pack constituted with a plurality of cells, and more specifically, it relates to a capacity adjustment apparatus and a capacity adjustment method for a battery pack that is installed in a vehicle.

2. Description of Related Art

There is an apparatus known in the related art that executes a capacity adjustment for individual cells constituting a battery pack when the voltage at any of the cells exceeds a bypass engaging voltage by discharging the cell via a bypass resistor (see Japanese Laid Open Patent Publication No. H10-322925).

SUMMARY OF THE INVENTION

However, the apparatus in the related art has a problem yet to be effectively addressed in that the bypass resistor needs to have a large thermal capacity in order to complete the capacity adjustment more quickly by increasing the bypass current.

A battery pack capacity adjustment apparatus installed in a vehicle, which executes a capacity adjustment for a battery pack constituted by connecting in series a plurality of cells, includes capacity adjustment circuits each provided in correspondence to one of the plurality of cells to execute the capacity adjustment by discharging the corresponding cell when a voltage at the corresponding cell exceeds a predetermined bypass engaging voltage, a voltage variance abnormality detection device that detects a voltage variance abnormality manifesting among the plurality of cells, a vehicle stop predicting device that predicts that the vehicle, which is currently traveling, is to stop, and a charge/discharge control device that controls charge/discharge of the battery pack so as to increase cells with voltages thereof exceeding the predetermined bypass engaging voltage if the voltage variance abnormality detection device detects a voltage variance abnormality among the plurality of cells and the vehicle stop predicting device predicts that the traveling vehicle is to stop.

A battery pack capacity adjustment method for executing a capacity adjustment for a plurality of cells constituting a battery pack by using capacity adjustment circuits each provided in correspondence to one of the plurality of cells to discharge the corresponding cell when a voltage at the corresponding cell exceeds a predetermined bypass engaging voltage, includes steps for detecting a voltage variance abnormality among the plurality of cells, predicting that the vehicle with the battery pack installed therein, which is currently traveling, is to stop, and controlling charge/discharge of the battery pack so as to increase cells with voltages thereof exceeding the predetermined bypass engaging voltage when a voltage variance abnormality among the plurality of cells is detected and the traveling vehicle is predicted to stop.

BRIEF DESCRIPTION OF THE DRAWINGS

FIGS. 6A–6C show changes occurring in the voltages at the individual cells when the capacity adjustment is executed by the battery pack capacity adjustment apparatus in the embodiment.

DETAILED DESCRIPTION OF THE PREFERRED EMBODIMENT

Figure 1:
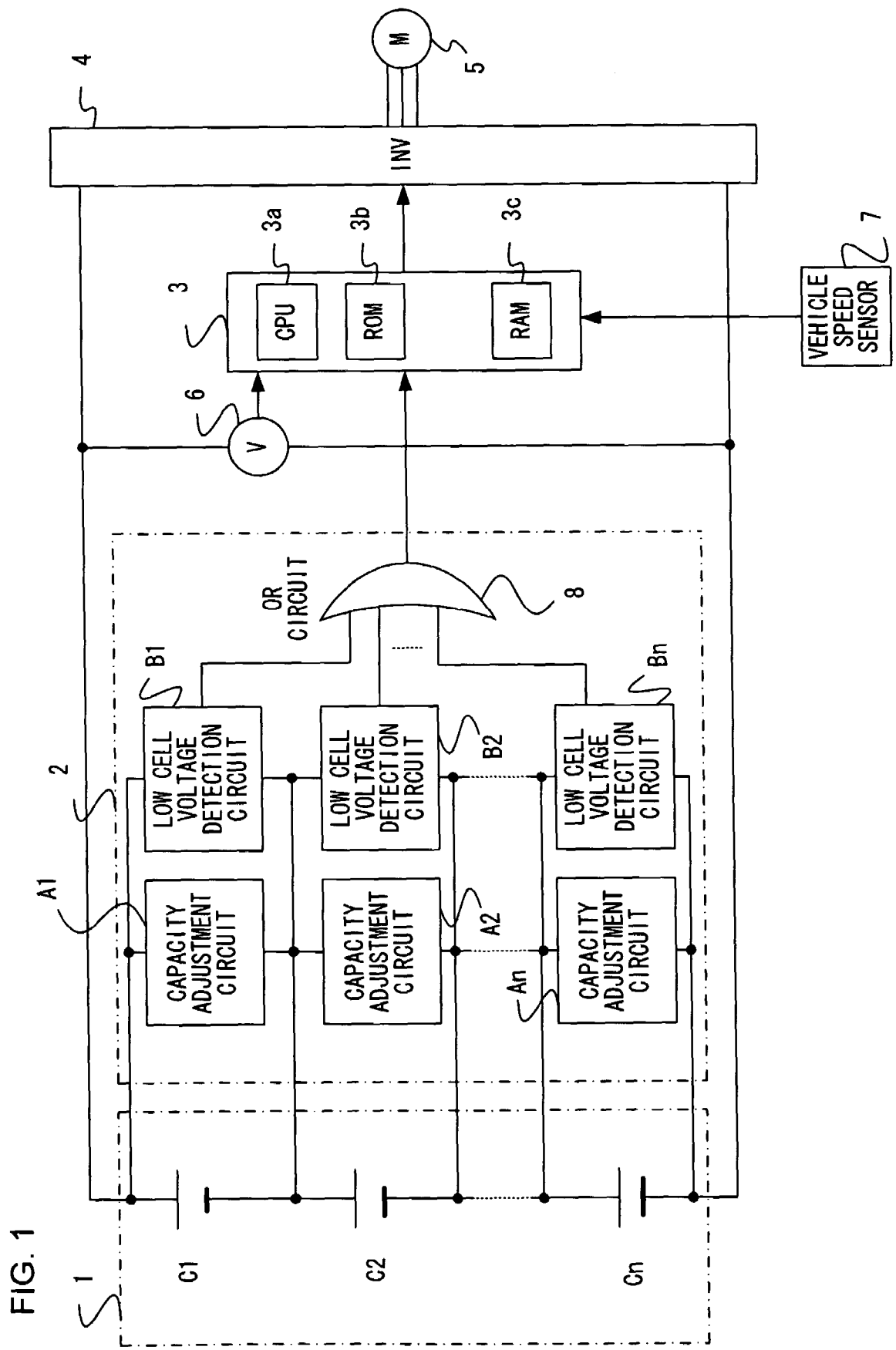
FIG. 1 shows the system configuration of an embodiment in which the battery pack capacity adjustment apparatus according to the present invention is adopted in a hybrid car.

FIG. 1 shows the system configuration of an embodiment in which the battery pack capacity adjustment apparatus according to the present invention is adopted in a hybrid car. A battery pack 1 is constituted by connecting in series n (n: positive integer) cells C1 to Cn. An AC voltage obtained by converting at an inverter 4 a DC voltage of the battery pack 1 is applied to a three-phase AC motor 5 which is a traveling drive source of the vehicle. A control unit 3, which includes a CPU 3a, a ROM 3b and a RAM3c, charges and discharges the battery pack 1 by controlling the inverter 4.

A voltage sensor 6 detects the total voltage $V_{bat}$ at the battery pack 1 and outputs the detected total voltage to the control unit 3. A vehicle speed sensor 7 detects the speed of the vehicle and outputs the detected speed to the control unit 3.

Capacity adjustment circuits A1 to An respectively provided in correspondence to the cells C1 to Cn each discharge the corresponding cell when the voltage at the corresponding cell exceeds a predetermined bypass engaging voltage (threshold voltage), and thus, the capacity adjustment for the individual cells is achieved. Low cell voltage detection circuits B1 to Bn respectively provided in correspondence to the cells C1 to Cn each check the voltage at the corresponding cell to detect a decrease in the voltage to a level equal to or lower than a predetermined low-voltage decision-making voltage Vc1. An OR circuit 8 executes an OR operation on low-voltage detection signals output from any of the low cell voltage detection circuits B1 to Bn and outputs the results of the OR operation to the control unit 3.

Figure 2:
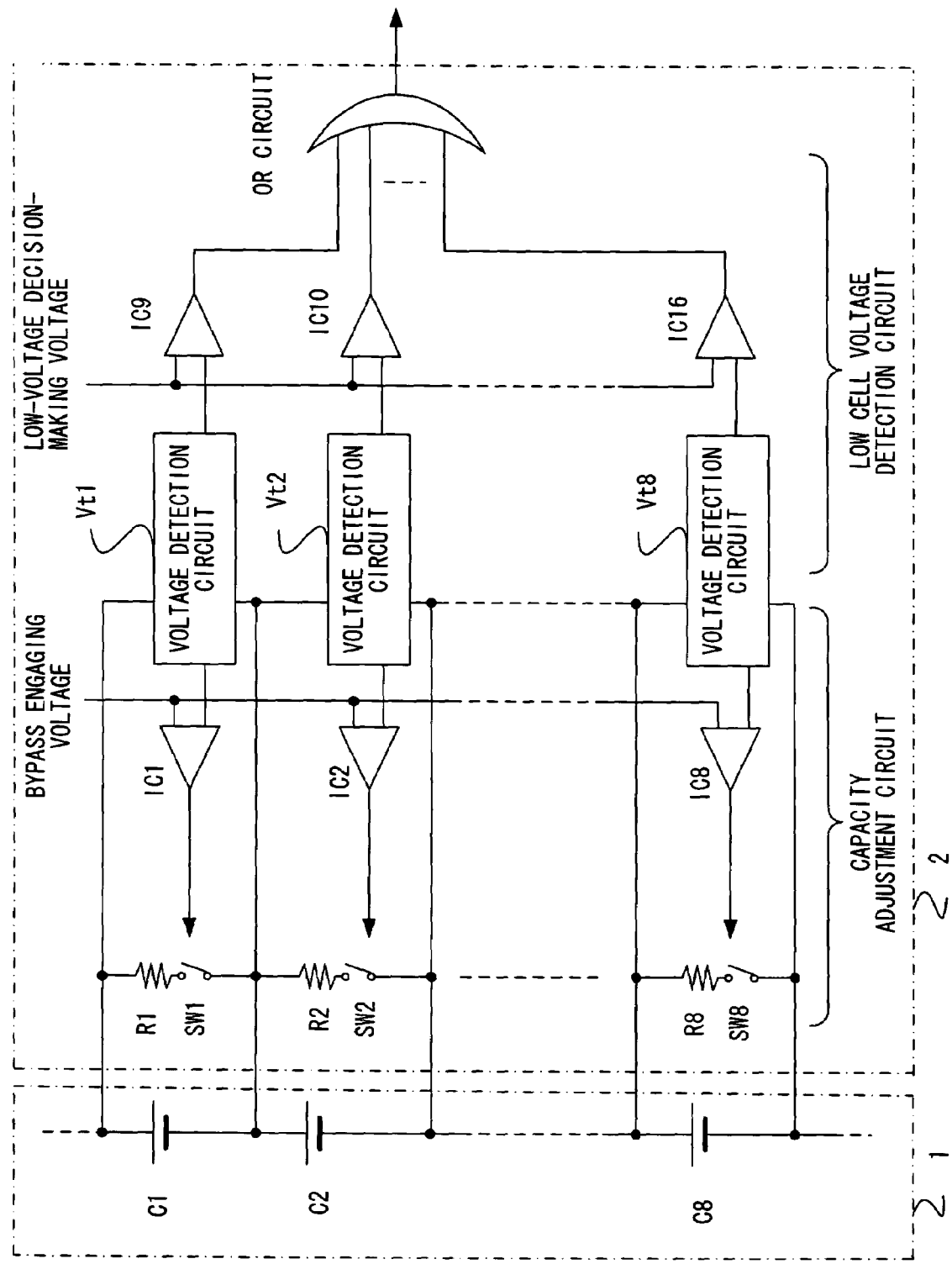
FIG. 2 shows in detail the structure of the circuit that includes capacity adjustment circuits, low cell voltage detection circuits and an OR circuit.

FIG. 2 shows in detail the structure adopted in the circuit that includes the capacity adjustment circuits A1 to An, the low cell voltage detection circuits B1 to Bn and the OR circuit 8 shown in FIG. 1. In order to simplify the explanation, it is assumed that the battery pack 1 is constituted with eight cells C1 to C8. The capacity adjustment circuits A1 to A8 respectively include bypass resistors R1 to R8, switches SW1 to SW8, voltage comparators IC1 to IC8 and voltage detection circuits Vt1 to Vt8.

The voltage comparators 1C1 to 1C8 compare the cell voltages detected by the voltage detection circuits Vt1 to Vt8 respectively with the predetermined bypass engaging voltage and output the results of the comparison to the corresponding switches SW1 to SW8. If a signal indicating that the cell voltage is higher than the bypass engaging voltage is input from any of the voltage comparators 1C1 to 1C8, the corresponding switch SW1 to SW8 enters an ON state. If, for instance, the switch SW1 is turned on, a current flows from the cell C1 via the bypass resistor R1 connected in series with the switch SW1. Namely, if a cell voltage exceeds the bypass engaging voltage, the cell is discharged via the corresponding bypass resistor. As a result, the extent of variance among the voltages at the individual cells is reduced.

The low cell voltage detection circuits B1 to B8 respectively include voltage comparators IC9 to IC16 and the voltage detection circuits Vt1 to Vt8. The voltage comparators IC9 to IC16 respectively compare the cell voltages detected at the voltage detection circuits Vt1 to Vt8 with the predetermined low-voltage decision-making voltage Vc1 and each output a signal indicating a low cell voltage if the corresponding cell voltage is judged to be equal to or lower than the low-voltage decision-making voltage Vc1. The OR circuit 8 outputs a low voltage signal to the control unit 3 if a signal indicating that the cell voltage is equal to or lower than the low-voltage decision-making voltage Vc1 is input thereto from any of the lower cell voltage detection circuits B1 to B8.

Figure 3:
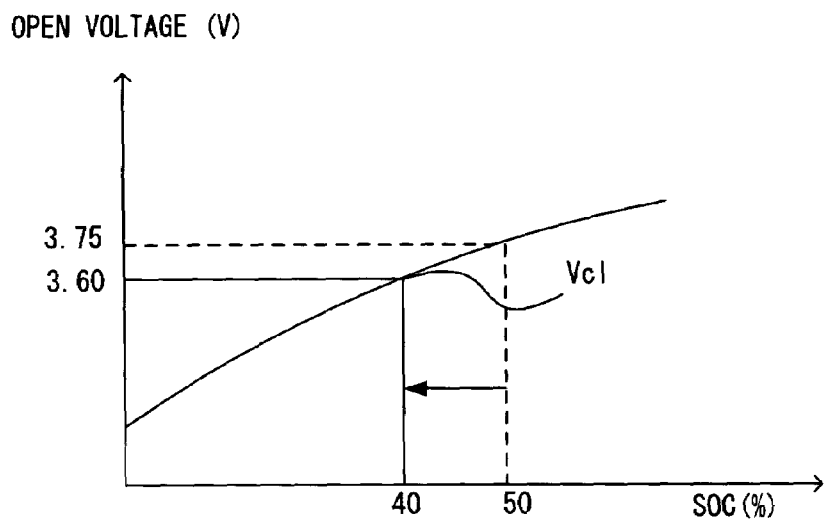
FIG. 3 shows the relationship between the cell SOC and the cell open circuit voltage.

The method adopted to set the low-voltage decision-making voltage Vc1 is now explained in reference to FIG. 3. FIG. 3 shows the relationship between the cell SOC and the cell open circuit voltage. When the target charging rate (target SOC) of the battery pack 1 in a regular charge/discharge mode to be detailed later is 50% and any cell with a charging rate of 40% is to be judged as abnormal, the open circuit voltage (3.60V) corresponding to the charging rate of 40% is set for the low-voltage decision-making voltage Vc1.

Figure 4:
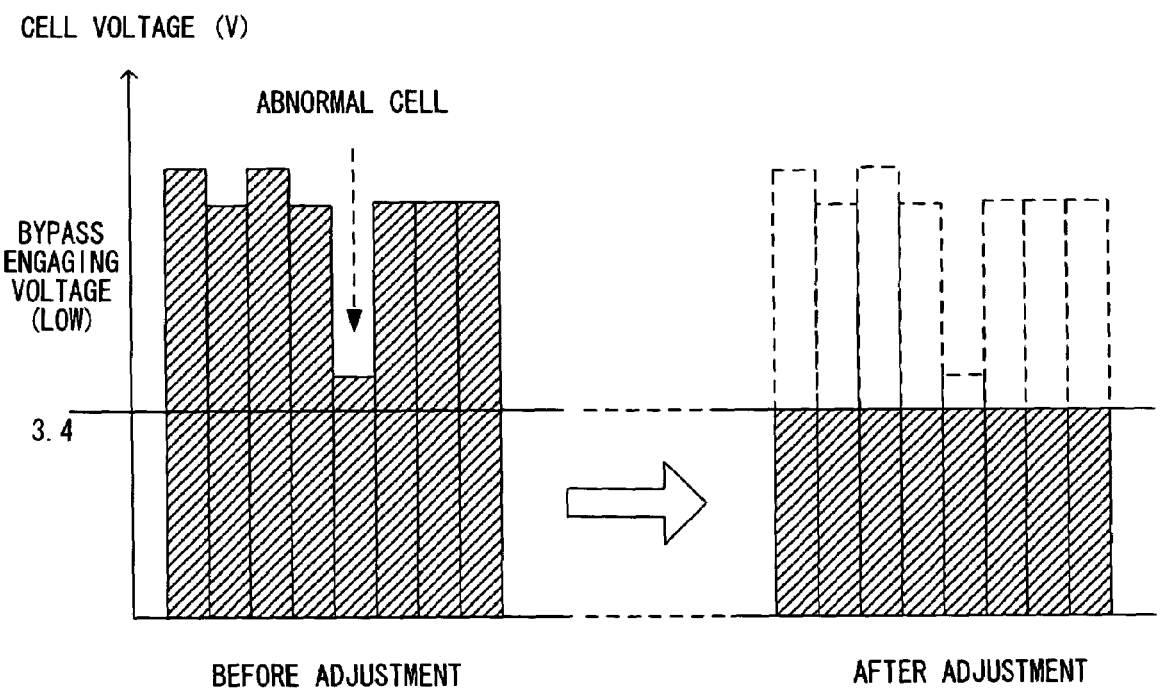
FIG. 4 shows the pre-capacity adjustment voltage variance among the individual cells and the post-capacity adjustment voltage variance, manifesting when the bypass engaging voltage is set to a low value (3.4V)

FIG. 4 shows the pre-capacity adjustment voltage variance among the individual cells and the post-capacity adjustment voltage variance, manifesting when the bypass engaging voltage is set to a low value (3.4V). Since the cell open circuit voltage is 3.75V (see FIG. 3) when the battery pack 1 is charged/discharged at the target charging rate of 50% in the regular charge/discharge mode, the voltages at all the cells exceed the bypass engaging voltage. Thus, when the bypass engaging voltage is set to a low value, the voltages at the individual cells are adjusted to a uniform level, but much electricity is discharged, resulting in a significant energy loss.

Accordingly, the bypass engaging voltage is set to a relatively high value in the battery pack capacity adjustment apparatus in the embodiment. In this example, it is set to a value (e.g., 3.9V) higher than the cell voltage (3.75V) achieved by charging the cells in reference to the target charging rate (50%) in the regular charge/discharge mode.

Figure 5:
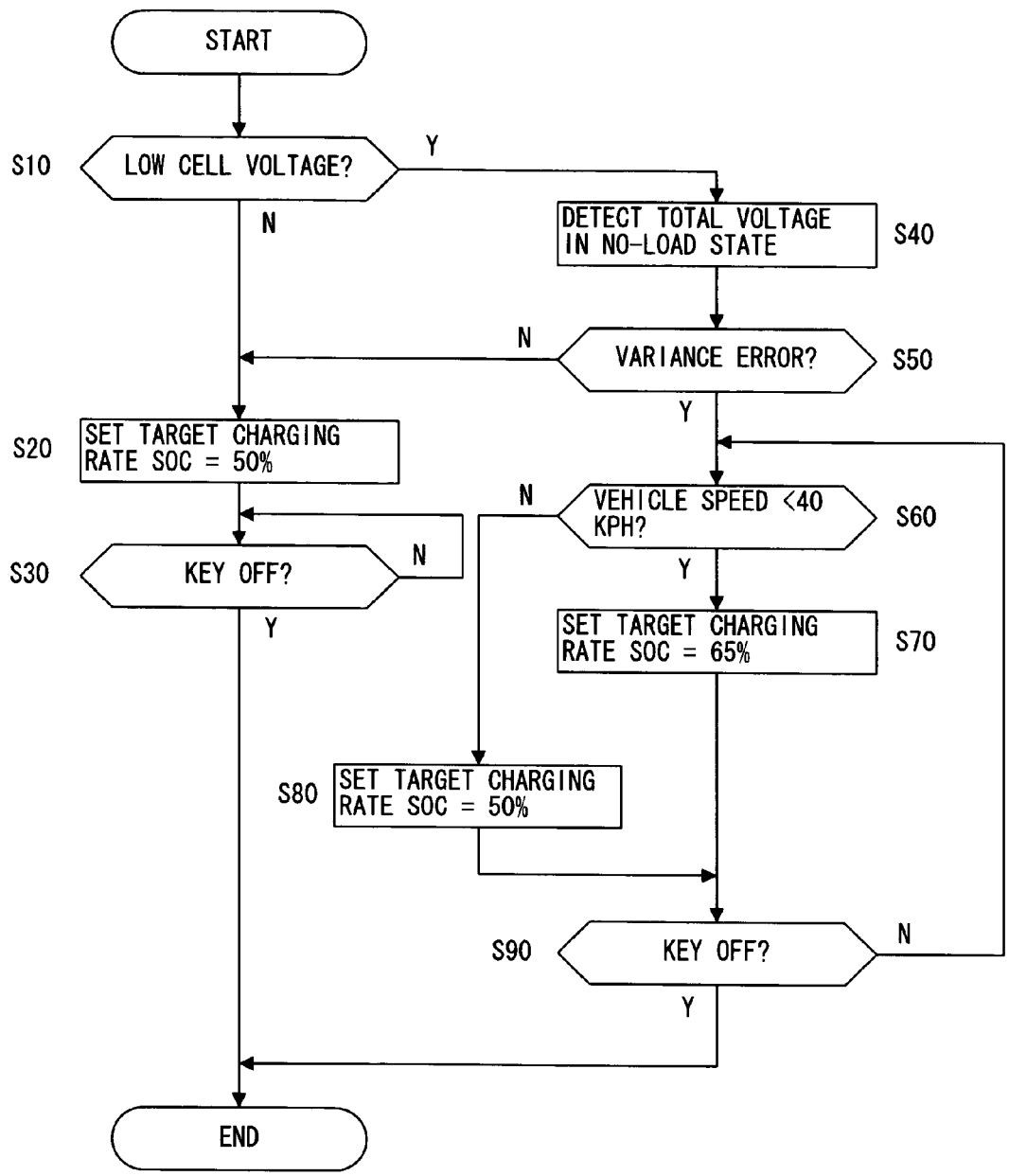
FIG. 5 presents a flowchart of the capacity adjustment procedure executed by the battery pack capacity adjustment apparatus in the embodiment.

FIG. 5 presents a flowchart of the capacity adjustment procedure executed by the battery pack capacity adjustment apparatus in the embodiment. The processing, which starts in step S10 as the key switch (not shown) is turned on, is executed by the CPU 3a in the control unit 3.

In step S10, a decision is made as to whether or not a signal indicating that a cell voltage is equal to or lower than the low-voltage decision-making voltage Vc1 has been input via the OR circuit 8 immediately after the vehicle is started up while the battery pack 1 is in a no-load state. The operation proceeds to step S40 if it is decided that the signal indicating that a cell voltage is equal to or lower than the low-voltage decision-making voltage Vc1 has been input and thus there is a cell with a lowered voltage, whereas the operation proceeds to step S20 otherwise.

The processing executed in steps S20 and S30 is regular charge/discharge mode processing. In step S20, the target charging rate for the battery pack 1 is set to 50%, and then the operation proceeds to step S30. In step S30, a decision is made as to whether or not the key switch (not shown) has been turned off. If the key switch is determined to have been turned off, the entire processing ends, whereas if it is decided that the key switch has not been turned off, the regular charge/discharge mode processing is continuously executed.

In step S40, the total voltage $V_{bat}$ at the battery pack 1 in the no-load state is detected with the voltage sensor 6. Once the total voltage $V_{bat}$ at the battery pack 1 in the no-load state is detected, the operation proceeds to step S50. In step S50, a decision is made as to whether or not the voltages at the individual cells manifest a voltage variance abnormality. First, a voltage variance $\Delta V$ is calculated, as indicated in (1) below.

$$\Delta V = (V_{bat}/n) - Vc1 \qquad (1)$$

As expression (1) indicates, the voltage variance $\Delta V$ is the difference between the average voltage among the individual cells C1 to Cn and the low-voltage decision-making voltage Vc1. It is to be noted that "n" indicates the number of cells.

It is decided that a voltage variance abnormality due to a lowered voltage has occurred if the voltage variance $\Delta V$ calculated as indicated in expression (1) is equal to or greater than a predetermined value (e.g., 0.1V). Namely, if it is decided in step S10 that there is a cell with a voltage lower than the low-voltage decision-making voltage Vc1 and the difference between the average voltage among the individual cells and the low-voltage decision-making voltage Vc1 is equal to or greater than the predetermined value, a voltage variance abnormality is judged to have occurred. The operation proceeds to step S60 if it is decided that the voltage variance abnormality has occurred, whereas the operation proceeds to step S20 if it is decided that the voltage variance abnormality has not occurred.

The processing executed in step S60 through S90 is variance adjustment preparation mode processing. In step S60, a decision is made as to whether or not the vehicle speed detected with the vehicle speed sensor 7 is lower than 40 kph. If the vehicle speed is determined to be less than 40 kph, the operation proceeds to step S70 in preparation for the capacity adjustment to be executed while the vehicle is in a stopped state. In step S70, the target charging rate for the battery pack 1 is set to 65%, which is higher than the target charging rate (50%) set in the regular charge/discharge mode. This target charging rate is set by ascertaining the charging rate corresponding to the cell open circuit voltage of 3.9V in the SOC-open circuit voltage curve presented in FIG. 3 so as to increase the number of cells with voltages exceeding the bypass engaging voltage (3.9V) when charging/discharging the battery pack 1.

If, on the other hand, it is decided in step S60 that the vehicle speed is equal to or higher than 40 kph, the operation proceeds to step S80. In step S80, the target charging rate for the battery pack 1 is set to 50% so as to give priority to the regular charge/discharge control and then the operation proceeds to step S90. In step S90, a decision is made as to whether or not the key switch (not shown) has been turned off. The entire processing ends if the key switch is determined to have been turned off, whereas the operation returns to step S60 if it is decided that the key switch has not been turned off.

FIG. 6 shows changes occurring in the voltages at the individual cells when the capacity adjustment is executed by the battery pack capacity adjustment apparatus in the embodiment. When there is a cell with the voltage thereof equal to or lower than the low-voltage decision-making voltage Vc1, the voltage variance ΔV calculated as indicated in expression (1) is equal to or greater than the predetermined value (0.1V) and the vehicle speed is lower than 40 kph, prior to the capacity adjustment, the target charging rate is set to 65% which is higher than the regular target charging rate (steps S10 and S50 through S70 in the flowchart presented in FIG. 5). As a result, the number of cells with voltages exceeding the bypass engaging voltage increases. Subsequently, the capacity adjustment circuits A1 to An execute capacity adjustment in reference to the bypass engaging voltage, and thus, the voltage variance among the individual cells is minimized.

Figure 7:
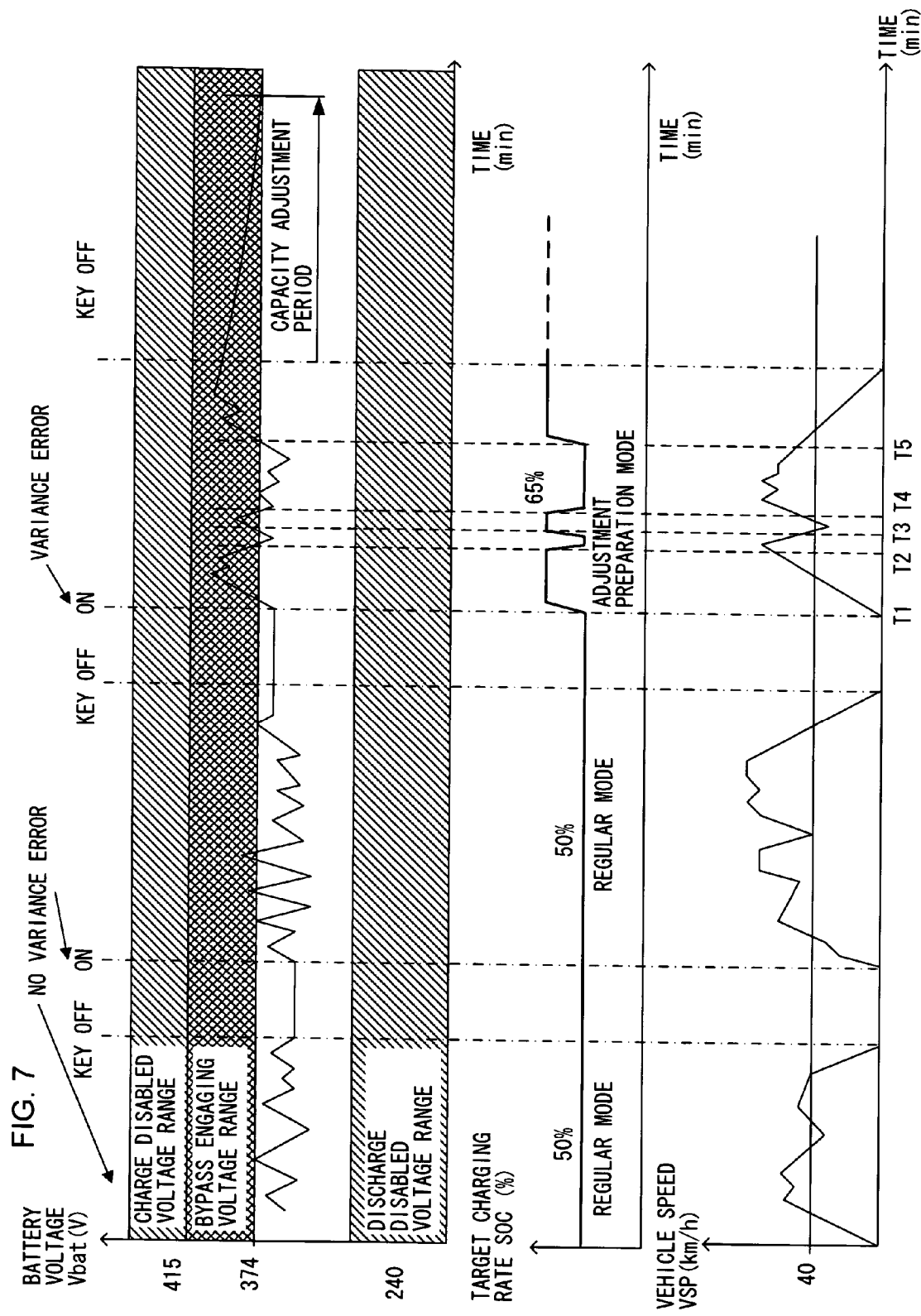
FIG. 7 shows the relationship among the change occurring over time in the total voltage $V_{bat}$ at the battery pack, the target charging rate and the vehicle speed.

FIG. 7 shows the relationship among the change occurring over time in the total voltage $V_{bat}$ at the battery pack 1, the target charging rate and the vehicle speed. While the key switch (not shown) is in an ON state, the total voltage $V_{bat}$ at the battery pack 1 fluctuates as the battery pack 1 is charged/discharged. Since the bypass engaging voltage $V_{bps}$ is set to a relatively high value as explained earlier, only the cells with the voltages thereof exceeding the bypass engaging voltage $V_{bps}$ are discharged via the respective bypass resistors and any cell with a lower voltage does not undergo the capacity adjustment in the regular charge/discharge mode.

As a voltage variance abnormality among the cells due to a lowered voltage is detected at a time point T1 in FIG. 7, the operation enters the variance adjustment preparation mode if the vehicle speed becomes lower than 40 kph (between time points T1 and T2, between time points T3 and T4 and after a time point T5). Namely, the target charging rate is set to 65% which is higher than 50% set in the regular charge/discharge mode. Thus, as shown in FIG. 7, while the regular charge/discharge mode control is implemented as long as the vehicle is traveling at a speed equal to or higher than 40 kph, the target charging rate is set to 65% on the assumption that the vehicle is to stop once the vehicle speed becomes lower than 40 kph. As explained earlier, once a cell voltage exceeds the bypass engaging voltage, the corresponding capacity adjustment circuit is engaged in operation to discharge the cell. This capacity adjustment is continuously executed after the key switch (not shown) in the vehicle is turned off. In FIG. 7, the operation enters the variance adjustment preparation mode at the time point T5, and the capacity adjustment is executed with the capacity adjustment circuits A1 to An to adjust the cell voltages to the level of the bypass engaging voltage even after the key switch in the vehicle is turned off subsequently.

As described above, the battery pack capacity adjustment apparatus in the embodiment is installed in a vehicle and includes the capacity adjustment circuits each of which executes the capacity adjustment by discharging the corresponding cell among the cells constituting the battery pack once the cell voltage exceeds the predetermined bypass engaging voltage. If a voltage variance abnormality among the plurality of cells is detected and the vehicle which is currently traveling is predicted to stop, the capacity adjustment apparatus raises the target charging rate for the battery pack from a first target charging rate (50%) to a second target charging rate (65%). Since this increases the number of cells with the voltages thereof exceeding the predetermined bypass engaging voltage, a higher degree of efficiency is achieved in the capacity adjustment executed with the capacity adjustment circuits while the vehicle is in a stopped state. Namely, since the capacity adjustment can be executed while the vehicle is in a stopped state, the bypass resistors R1 to R8 used in the respective capacity adjustment circuits can be miniaturized (their thermal capacity can be reduced).

While the voltage variance among the individual cells becomes more pronounced when the vehicle is used less frequently under normal circumstances, the battery pack capacity adjustment apparatus in the embodiment is able to execute the capacity adjustment after the vehicle is stopped over the period of time, during which the vehicle is left unused, and thus, the capacity adjustment can be executed more effectively. In addition, by executing the capacity adjustment over the period during which the vehicle is left unused, the battery pack constituted with cells among which the voltage variance has been eliminated can be used when the vehicle is started up next.

The bypass engaging voltage in reference to which the capacity adjustment circuits A1 to An execute the capacity adjustment is set to a value higher than the average voltage among the individual cells achieved by charging/discharging the battery pack at the first target charging rate in the regular charge/discharge mode and also equal to or lower than the average voltage among the individual cells achieved by charging/discharging the battery pack at the second target charging rate in the capacity adjustment mode. As a result, the capacity adjustment for the individual cells can be executed with a high degree of reliability while minimizing the extent of wasteful discharge during the capacity adjustment.

Since a voltage variance abnormality due to a lowered cell voltage is detected in the battery pack capacity adjustment apparatus in the embodiment based upon the results of the comparison of the cell voltages with the predetermined low-voltage decision-making voltage Vc1 and the relationship between the average voltage among the individual cells calculated based upon the total voltage at the battery pack 1 in the no-load state and the low-voltage decision-making voltage Vc1, the cell voltage variance abnormality can be detected through a simple circuit structure.

The present invention is not limited to the embodiment described above. For instance, while the battery pack capacity adjustment apparatus in the embodiment predicts that the vehicle is to stop when the vehicle speed becomes less than 40 kph, a prediction that the vehicle is to stop may be made by adopting another method. For instance, the vehicle may be predicted to stop when the vehicle approaches a preset destination by utilizing a car navigation system.

While the second target charging rate (65% in the embodiment) corresponds to the cell open circuit voltage of 3.9V, it may assume a value corresponding to a voltage higher than the bypass engaging voltage (3.9V in the embodiment). In such a case, the number of cells with the voltages thereof exceeding the bypass engaging voltage as the battery pack 1 is charged at the second target charging rate further increases, and thus, the capacity adjustment can be executed with an even higher degree of efficiency. However, if the second target charging rate is set to an excessively high value, the quantities of electrical charges to be discharged during the capacity adjustment increase, and for this reason, it is more desirable to set it to a value slightly higher than the value of the charging rate corresponding to the bypass engaging voltage.

Furthermore, while an explanation is given above on an example in which the battery pack capacity adjustment apparatus is adopted in a hybrid car, it may instead be adopted in another type of vehicle that may be a fuel cell car or an electric car.

The disclosure of the following priority application is herein incorporated by reference: Japanese Patent Application No. 2004-84756 filed Mar. 23, 2004.

What is claimed is:

1. A battery pack capacity adjustment apparatus installed in a vehicle, which executes a capacity adjustment for a battery pack constituted by connecting in series a plurality of cells, comprising:

capacity adjustment circuits each provided in correspondence to one of the plurality of cells to execute the capacity adjustment by discharging the corresponding cell when a voltage at the corresponding cell exceeds a predetermined bypass engaging voltage;

a voltage variance abnormality detection device that detects a voltage variance abnormality manifesting among the plurality of cells;

a vehicle stop predicting device that predicts that the vehicle, which is currently traveling, is to stop; and a charge/discharge control device that controls charge/discharge of the battery pack so as to increase cells with voltages thereof exceeding the predetermined bypass engaging voltage if the voltage variance abnormality detection device detects a voltage variance abnormality among the plurality of cells and the vehicle stop predicting device predicts that the traveling vehicle is to stop.

2. A battery pack capacity adjustment apparatus according to claim 1, further comprising:

a vehicle speed detection device that detects a speed of the vehicle, wherein:

the vehicle stop predicting device predicts that the vehicle is to stop when the vehicle speed detected by the vehicle speed detection device becomes equal to or lower than a predetermined vehicle speed.

3. A battery pack capacity adjustment apparatus according to claim 1, wherein:

the charge/discharge control device raises a target charging rate for the battery pack from a first target charging rate to a second target charging rate in order to increase the cells with the voltages thereof exceeding the predetermined bypass engaging voltage.

4. A battery pack capacity adjustment apparatus according to claim 3, wherein:

the predetermined bypass engaging voltage is a voltage higher than an average voltage among the individual cells achieved by charging/discharging the battery pack at the first target charging rate and also equal to or lower than an average voltage among the individual cells achieved by charging/discharging the battery pack at the second target charging rate.

5. A battery pack capacity adjustment apparatus installed in a vehicle, which executes a capacity adjustment for a battery pack constituted by connecting in series a plurality of cells, comprising:

capacity adjustment means, each provided in correspondence to one of the plurality of cells, for executing the capacity adjustment by discharging the corresponding cell when a voltage at the corresponding cell exceeds a predetermined bypass engaging voltage;

a voltage variance abnormality detection means for detecting a voltage variance abnormality manifesting among the plurality of cells;

a vehicle stop prediction means for predicting that the vehicle, which is currently traveling, is to stop; and a charge/discharge control means for controling charge/discharge of the battery pack so as to increase cells with voltages thereof exceeding the predetermined bypass engaging voltage if the voltage variance abnormality detection means detects a voltage variance abnormality among the plurality of cells and the vehicle stop prediction means predicts that the traveling vehicle is to stop.

6. A battery pack capacity adjustment method for executing a capacity adjustment for a plurality of cells constituting a battery pack by using capacity adjustment circuits each provided in correspondence to one of the plurality of cells to discharge the corresponding cell when a voltage at the corresponding cell exceeds a predetermined bypass engaging voltage, comprising steps for:

detecting a voltage variance abnormality among the plurality of cells;

predicting that the vehicle with the battery pack installed therein, which is currently traveling, is to stop; and controlling charge/discharge of the battery pack so as to increase cells with voltages thereof exceeding the predetermined bypass engaging voltage when a voltage variance abnormality among the plurality of cells is detected and the traveling vehicle is predicted to stop.

* * * * *